United States Patent
Flynn

(10) Patent No.: US 6,258,397 B1
(45) Date of Patent: *Jul. 10, 2001

(54) FOOD PRODUCT AND METHOD OF MAKING SAME

(75) Inventor: Michael Shaun Flynn, Victoria (AU)

(73) Assignee: Australian Co-operative Foods Limited, North Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/352,121

(22) Filed: Jul. 13, 1999

Related U.S. Application Data

(63) Continuation of application No. 08/732,493, filed on Oct. 31, 1996, now Pat. No. 5,939,126.

(30) Foreign Application Priority Data

May 2, 1994 (AU) .................................................. PM5404

(51) Int. Cl.[7] .................................................. A23C 9/154
(52) U.S. Cl. ........................ 426/564; 426/570; 426/573; 426/576; 426/586
(58) Field of Search .................... 426/564, 570, 426/573, 576, 586

(56) References Cited

U.S. PATENT DOCUMENTS

| | | | |
|---|---|---|---|
| 3,734,745 | * | 5/1973 | Cassanem ........................... 99/130 |
| 4,012,533 | * | 3/1977 | Jonas .................................. 426/565 |
| 4,254,156 | * | 3/1981 | De Socio ........................... 426/565 |
| 4,312,891 | * | 1/1982 | Eisfeldt ............................. 426/573 |
| 4,578,276 | * | 3/1986 | Morley .............................. 426/565 |
| 4,869,917 | * | 9/1989 | Cummingham .................. 426/564 |
| 5,352,474 | * | 10/1994 | Lammers ......................... 426/564 |
| 5,520,946 | * | 5/1996 | Chablaix ........................... 426/564 |
| 5,939,126 | * | 8/1999 | Flynn ................................ 426/564 |

FOREIGN PATENT DOCUMENTS

| | | |
|---|---|---|
| 0 191 487 | 8/1986 | (EP) . |
| 1 307 715 | 2/1973 | (GB) . |
| 94/21136 | 9/1994 | (WO) . |

OTHER PUBLICATIONS

Charley 1970 Food Science The Ronald Press Company New York p. 277–280.*
Wong 1988 Fundamentals of Dairy Chemistry 3rd Edition Van Nostrand Reinhold NY p 50–52.*
Webb 1965 Fundamentals of Dairy Chemistry AV1 Publishing Co., Inc Westport CT p 804–805.*
Easy Homemade Desserts with Jello Pudding 1977 General Foods Corp. NY p 5, 60, 77, 87.*
Webb 1965 Fundamentals of Dairy Chemistry 3rd Edition p 804–805.*
Wong 1988 Fundamentals of Dairy Chemistry 3rd Edition p 50–52.*
Abstract of JP 4–187047 dated Jul. 3, 1992.
Abstract of JP 1–247034 dated Oct. 2, 1989.
Abstract of JP 63–202339 dated Aug. 22, 1988.
Abstract of JP 63–19458 dated Nov. 22, 1994.

* cited by examiner

Primary Examiner—Carolyn Paden
(74) Attorney, Agent, or Firm—Evenson, McKeown, Edwards & Lenahan, P.L.L.C.

(57) ABSTRACT

A method for making a stable dessert type food product using cream, artificial cream, thickened cream or cream cheese which involves adding to the first aerated mixture as a hot liquid solution gelatine directly into the much cooler mixture while this is being substantially beaten and then allowing the resultant product to set while maintaining the aerated structure.

8 Claims, No Drawings

FOOD PRODUCT AND METHOD OF MAKING SAME

This application is a continuation of application Ser. No. 08/732,493, filed Oct. 31, 1996, now U.S. Pat. No. 5,931,126.

BACKGROUND OF THE INVENTION

This invention relates to a food product and a method of making a food product.

The type of food product to which this invention is directed can be referred to as a settable dessert or a dessert product or it sometimes can be referred to as a mousse but while being similar the product of this invention is in fact none of these although for convenience it will be referred to as a dessert type product.

Many dessert type products are available in ready-to-use form but these have limitations either in relation to their long keeping ability, their ability to be frozen and refrozen without losing their structure and/or their ability to accept and integrate with fruit products which may have high acidity without losing their structure. Furthermore such existing commercial dessert type products do not have a richness or quality taste to be used directly in high class restaurants or to be sold in shops as a high class dessert.

SUMMARY OF THE INVENTION

It is an object of this invention to provide a food product and a method of manufacture of a food product generally of dessert type which at least to some extent reduces one or more of the problems expressed above or provides the public with a useful alternative.

This invention in one form can be said to reside in a method of making a food product which comprises the steps of aerating while cold one or more of the ingredients selected from cream, thickened cream, artificial cream or cream cheese to an extent that there is by reason of aeration a substantial overrun of the original volume of the selected ingredients, then adding dissolved gelatine as a hot solution to the cold aerated ingredients and mixing the aerated product with the hot gelatine solution and then allowing the resultant mixture to set.

In preference the method includes adding further ingredients selected at least from sugar, flavouring, fruit, fruit juice and water.

In preference the method can be further characterised in that the extent of overrun is within the range of from 10% to 40% of the volume of the original unaerated volume.

It is sometimes difficult to get up to 40% overrun but approximately 25% overrun is found to be ideal.

Best methods of manufacture of a food product in accord with this invention will now be given it being emphasised that the specific performance is not intended to illustrate the only way in which the invention can be achieved.

It will be useful to discuss the invention in general before the specific description will be given.

It has been previous conventional practice not to add hot gelatine solution to a cold aerated mix. I think this was on the presumption that such a step would result in a collapse of the aerated mix. What I have found instead is that with careful selection of quantities and proportions that the gelatine can set in a way which is different to anything I have previously known and there are significant advantages from this different result.

I think that the gelatine solution will initially follow the path of the existing cold ingredients which flow around the air bubbles. If the gelatine sets before the aeration collapses then the gelatine will have to have set with a structure that may resemble a fractured sponge so that the gelatine may be sinuous and tortuous.

In other words by introducing a hot (approximately 80 degrees Centigrade) gelatine solution into the aerated form of the cold (approximately 10 degrees Centigrade after the hot gelatine solution is added) mix of cream or cream like materials means that the gelatine while still unset can be distributed so as to follow the cellular shapes of the aerated materials and as such when it sets its structure will be perhaps sinuous and tortuous as a result.

This different structure of set gelatine from our experiments offers a number of advantages. If the resultant product is frozen then if as would be expected the liquid components of the mixture expand upon being frozen but with the body structure of the gelatine being sinuous and tortuous this means that such an action may not, unlike a homogeneous structure might be broken into small fragments that will not subsequently interlink. There can still be after the product has thawed a connected structure of sinuous lengths of the gelatine which hold together in a connected way because of the tortuous shape of these. This is at this stage a theory as to the reason why this invention provides a useful result.

The method of the invention is more stable than other similar products in the presence of fruit or fruit juices. I believe this may be because the gelatine will not be so fractured after setting as can be the case with other forms of manufacture and as such the material is more chemically resistant against enzyme or acid attack.

In this specification reference to the word "hot" is intended as a reference to a temperature that would be considered as hot to those working in this field and comprises a temperature of liquid above which a person would not comfortably leave their hand in the liquid. This temperature is at a minimum about 48° Centigrade and any temperature above this would be hot for the purposes of this specification.

DESCRIPTION OF THE PREFERRED EMBODIMENTS

The invention will be better understood when described with reference to embodiments which will now be described.

I will describe now the ingredients and method of preparation of four products, these being a chocolate product, a lemon product, a strawberry product and a neutral flavoured product It has to be understood that I am describing the preferred ingredients and quantities but the reader will known that as with all food products these can be altered to accord with individual tastes and while I will indicate some of the variations that I have found to be acceptable I am sure there are other variations that may be found with further easy trials.

EXAMPLE 1

The chocolate product

For a chocolate product a mix of the product will include 10 liters of thickened cream (35% butter fat), 3 kilograms of sugar, 3 kilograms of finely chopped chocolate and 600 grams of 10/12% alkalised cocoa. If there is an excess of 600 grams of cocoa there is obtained an interior product but this inferiority is not immediately apparent. The product, however, turns a darker brown in a short time and does not keep so well. It also has too rich a taste. If too little cocoa is used then the richness of the taste is not obtained. This mix will make approximately 21 liters of product.

The method for making the chocolate product is as follows:

The cream is put into a beater and the sugar, cocoa powder and chocolate pieces are added and blended slowly until a consistent product is obtained. It is then beaten faster to aerate the product to approximately 25% overrun but the amount of beating must be less than will result in break down separation or curdling.

This pre-mix can be stored at this stage either in a refrigerator or in a freezer. For every 5 liters of product as thus made the following extending method can be used. One and one half liters of thickened cream (thickened cream in a conventional way by the addition of gelatine but not in the unique way of this invention) is then added to 5 liters of finished product and this is rebeaten to a piping consistency. A slurry or extender mix consisting of 300 grams of cream cheese (fat in dry matter 68%) is added to 300 mls of hot water (80 degrees Centigrade) and whisked to melt The mix may require additional heating for a short time to bring back to sufficient heat to then add 55 grams of gelatine added so as to dissolve the gelatine. The original finished product ambient temperature is approximately 10 degrees Centigrade. To this is added the extender mix, using the following method:

Slowly pour the hot gelatine solution into the cold premix whilst the premix is on a slow speed mixer. This step is achieved using a thin wire whisk (Hobart 600T with 36 wires running at a speed of about 2 revolutions per second) with a solution being directed into the spinning whisk so as to distribute and incidentally cool the hot gelatine solution. This takes about 10 to 15 seconds. Then a faster mix (4 revolutions per second) is used for a very short period of time. This has the affect of substantially distributing the gelatine and to some extent creating the structure that has been found to be of such value. The material at the temperature stated and allowing for ambient temperature to be mild is able to be handled for about 20 minutes after which it needs to be allowed to rest to allow undisturbed complete setting of the gelatine. The final product before setting can be placed into presentation vessels or stored by freezing until required. Refrigerator life of this product may be at least 6 months frozen or 3 weeks in a refrigerator at 2 degrees Centigrade.

It has been found that some of the quantities of the product can be varied while still achieving the advantages of the invention. For instance the quantity of chocolate in this example can be reduced to 2.5 kilograms which while it changes the richness of the product none the less can be acceptable as a chocolate material.

Sugar can be reduced as a matter of taste and I have found that 2.5 kilograms still produces an acceptable sweetness for most palates for a sweet product.

EXAMPLE 2

The lemon product

In the case of a lemon flavoured product this can either be made in a one stage or a two stage process. In the product there is 226 grams of gelatine, 10 liters of cream, 1240 grams of cream cheese, 2.7 liters of lemon juice, 2050 grams of sugar, 4 kgs of condensed milk and 2.0 liters of hot water.

The method of manufacturing the product is as follows:

The sugar and cream cheese are combined and mixed at a slow speed until they form an even paste. The condensed milk is added and then beaten again to further aerate this. Next the 10 liters of cream is added and beaten to aerate it until it has an overrun of up to 25%. Once again too much beating can cause problems of separation of the product. The lemon juice is then poured into the main mix.

The hot water with gelatine dissolved therein is then added to the main mix (which is at 10 degrees Centigrade) by slowly pouring the hot gelatine solution into the main mix whilst the main mix is in a slow speed mixer. This step is achieved as has been described previously with the chocolate product using a thin wire whisk (Hobart H 600T machine with 36 wires running at a speed of about 2 revolutions per second) with the solution being directed into the spinning whisk so as to distribute and incidentally cool the hot gelatine solution. This takes about 10–15 seconds. Then a faster mix (4 revolutions per second) is used for a very short period of time. This has the effect of substantially distributing the gelatine and to some extent creating the structure that has been found to be of such value.

The extender method can now be applied as set out previously.

Once again the product can be used immediately for filling for cheese cakes, swiss rolls, parfait rolls and the like, may be put into presentation packs or stored in the freezer until required and thawed and if necessary refrozen.

In the main mixture the quantity of gelatine can be altered but for the quantities given a range from 200 grams to 275 grams would be still effective. However anything over about 250 grams would be starting to be too rubbery and below about 210 grams the result would somewhat greater instability of the mixture. The cream cheese could go from 1.24 up to 2 kgs but the mixture would then be a lot heavier, so to achieve lightness the quantity should be kept no more than 1.5 kgs. Lemon juice could be 2.6 but not more than 2.7 is preferred. Sugar at 2.05 kgs could perhaps be reduced to 1.8 kgs but it is preferred not to exceed 2.05 kgs. 4 Kgs of condensed milk can be reduced significantly by as much as a liter. The quantity of hot water could increase perhaps to 2.2 liters but more than this could affect the setting properties of the product.

EXAMPLE 3

The strawberry product

In the case of a strawberry flavoured product the product may be again made in a one stage or a two stage process. The total quantity of ingredients is 10 liters of cream, 1 kilogram of strawberries, 2.0 kilograms of cream cheese, 226 grams of gelatine, 2.0 liters of hot water and 2.5 kilograms of sugar.

In the case of the strawberry product the method of manufacture is as follows:

The sugar and cream cheese are then mixed together to form a smooth paste. The thickened cream is then added and the mixture is aerated. As the mixture reaches approximately 25% overrun 1 kilogram of strawberries is added and beaten in and then as it reaches its optimum overrun the hot water and gelatine mixed in with this is then added to the cream whilst on the beating cycle. This gelatine solution is added to the main mix (which is at 10 degrees Centigrade) by slowly pouring the hot gelatine solution into the main mix whilst the main mix is in a slow speed mixer. This step is achieved as has been described previously with the chocolate product using a thin wire whisk (Hobart H 600T machine with 36 wires running at a speed of about 2 revolutions per second) with the solution being directed into the spinning whisk so as to distribute and incidentally cool the hot gelatine solution. This takes about 10–15 seconds. Then a faster mix (4 revolutions per second ) is used for a very short period of time.

The extender method can now be applied as set out previously.

The final product can be used for fillings, addition to cheese cakes, parfaits, pavlovas and fruit flans or piped into chocolate cups and the like. Once again the settable dessert can be stored frozen and thawed for usage as required.

For any one of the three flavours of products discussed these may be served directly frozen and can be shaped while frozen in the same way as ice cream cones, or the product can be shaped whilst still being liquid and then allowed to set in the desired shape.

Much the same alterations in quantities can be made here as with the lemon product.

EXAMPLE 4

The neutral product 1240 grams of cream cheese is blended with 2050 grams of sugar until a smooth paste is formed. 4 kilograms of condensed milk is then added and the mixture aerated for 2 minutes. Then there is added 10 liters of thickened cream (the cream is previously thickened using gelatine in an entirely conventional way) and the mixture beaten until there is a 25% overrun achieved. 226 grams of gelatine in 2 liters of water which is hot (80 degrees Centigrade) is then slowly poured into the mixture whilst the beater is still running this being the same technique and equipment as has been described with the previous products namely the mix is added to the main mix (which is at 10 degrees Centigrade) by slowly pouring the hot gelatine solution into the main mix whilst the main mix is in a slow speed mixer using a thin wire whisk (Hobart H 600T machine with 36 wires running at a speed of about 2 revolutions per second) with the solution being directed into the spinning whisk so as to distribute and incidentally cool the hot gelatine solution. This takes about 10–15 seconds. Then a faster mix (4 revolutions per second) is used for a very short period of time. Once the gelatine has been fully introduced into the mixture the beating is stopped.

This results in a generally useful product which does not have a preconceived flavour. Its closest relations in the food world would be Vanilla flavoured ice cream and cream patissier but it is different from these for the following reasons.

Vanilla ice cream and cream patissier are made with egg product which is implicitly more susceptible to bacterial attack. Further it can be said ice cream by name is ice cream by nature. Cream patissier on the other hand is really a custard. Ice cream can be moulded when in liquid form and then frozen. It will then hold its shape until thawed and will then go back into its original liquid form but at this time it will also experience drop out because of the emulsifiers within it. Cream Patissier on the other hand will hold its shape to a point but it is designed more for use as a filler for fruit flans, gateaux and choux pastries. The product also contains milk and will set with a skin unlike the product of the present invention It is a further advantage of our invention that it is resistant to the skinning effect commonly seen in many custard style desserts.

Alterations that may stay within a preferred range are the same as with the lemon product except I would prefer with this product not to reduce the condensed milk so much so that perhaps I would reduce the condensed milk as a maximum only by one half a liter.

The product resulting from example 4 in comparison will accept all types of fruit. Nature identical essences and can be piped into any shaped mould, frozen and when taken out of that mould can be thawed and left at room temperature or chilled in the refrigerator and it will still retain its integrity of quality and flavour. It can also be refrozen if the product has been thawed out in the fridge and is not required for several weeks again without loss of quality provided however that there is no bacterial spoilage. (In one test that has been conducted on the lemon flavoured example, the product was incubated for 24 hours at 25 degrees Centigrade with a bacteria count being under 2 at the end of the incubation period).

In each case the product when it is formed is in a pourable or pipable liquid form but will set relatively quickly at temperatures 4–5 degrees Centigrade and after freezing and thawing will retain its set shape and will not weep or bleed liquid. Any one of the products can be formed into a log shape and after freezing cut into slices for individual serves and each of the serves will hold its shape after thawing. The product can be placed into any type of mould and frozen and then removed from that mould and allowed to thaw in refrigeration or at room temperature and will still hold in appearance and shape and still hold its high quality.

Many products and especially dairy products are not able to accept fruit, that is they are substantially fruit intolerant (probably because of a high acidity of the fruit or because of enzymes). In the case of this invention this does not appear to happen.

Through this invention there is provided a dessert product and a product suitable for further processing by bakeries, caterers, cafes and restaurants and the like which has considerable advantage over current products presently available. The quality of the product is by far more superior, the product will keep in refrigeration longer than known existing products it can be frozen with no ill effects. Once blended into further products such as cheese cakes it can be refrozen and taken out of the freezer when required for sale or decoration for use.

Other products such as liqueurs, fruit or other flavouring may be used to further flavour the product without deleterious effects.

It will be realised, too, that flavourings other than those discussed above such as coffee, or other fruits may be used as basic flavourings.

Overall it will be seen that by this invention there is provided a new method of production of a food product and a food product in the style of settable dessert or reprocessable dessert product which has properties which make it especially advantageous for use not only in cafes and restaurants but also in the bakery and catering trade where further processing may be used or where it may be used as a filling for a wide range of products.

What is claimed is:

1. A method of making a food product comprising aerating an ingredient selected from the group consisting of cream, artificial cream, thickened cream, cream cheese, and mixtures thereof to thereby result in an overrun of the original unaerated volume of the ingredient, adding a hot aqueous solution of gelatin of a temperature of at least about 48° C. to the cold aerated ingredient while mixing, and then allowing the resultant product to set while maintaining the aerated structure, wherein the proportions of gelatine solution to total weight of the product are within the range of from 1%–3%.

2. A method of making a food product comprising aerating an ingredient selected from the group consisting of cream, artificial cream, thickened cream, cream cheese, and mixtures thereof to thereby result in an overrun within the range of from 10% to 40% of the volume of the original unaerated volume of the ingredient, adding a hot aqueous solution of gelatin of a temperature of at least about 48° C. to the cold aerated ingredient while mixing, and then allowing the resultant product to set while maintaining the aerated structure, wherein the gelatine solution is added while at a temperature of approximately 80° C.

3. A method of making a food product comprising aerating an ingredient selected from the group consisting of cream, artificial cream, thickened cream, cream cheese, and mixtures thereof to thereby result in an overrun within the range of from 10% to 40% of the volume of the original unaerated volume of the ingredient, adding a hot aqueous solution of gelatin of a temperature of at least about 48° C. to the cold aerated ingredient while mixing, and then allowing the resultant product to set while maintaining the aerated structure, wherein the proportions of gelatine solution to total weight of the product are within the range of from 1%–3%.

4. A method of making a food product which comprises aerating a cold base material selected from the group consisting of cream, artificial cream, thickened cream, cream cheese, and mixtures thereof to thereby result in an overrun in the range from 10% to 40% by volume of the original unaerated volume of the base material, preparing a hot aqueous solution of gelatin with a selected volume of solution, gelatin content and temperature to permit effective, rapid and substantially uniform distribution of the gelatin through the base material to provide a food product with thermal stability and capability of admixture with other ingredients, adding the gelatin solution to the cold base material while effecting rapid mechanical mixing, and wherein the gelatin solution provides:

(A) sufficient thermal load to maintain the gelatin solution and the cold base material with low enough viscosity to permit rapid and substantially uniform distribution during the mixing step;

(B) sufficient gelatin to provide the stability required in the food product; and (C) sufficient gelatin to substantially obviate breakdown or collapse of the aerated base material during or after the mixing step;

wherein the hot gelatin solution comprises approximately 10% by weight of the cold base material and wherein the cold base material and the gelatin solution are selected in volume and temperature:

(D) to achieve a few °C. rise in temperature of the base material on mixing in of the hot gelatin solution and immediately on completion of mixing; and (E) to achieve in the food product a temperature of approximately 10° C. on completion of mixing; and wherein the gelatin solution is selected to provide a gelatin content of the final product in the range of 1% to 3% by weight.

5. A method of making a food product which comprises aerating a cold base material selected from the group consisting of cream, artificial cream, thickened cream, cream cheese, and mixtures thereof to thereby result in an overrun in the range from 10% to 40% by volume of the original unaerated volume of the base material, preparing a hot aqueous solution of gelatin with a selected volume of solution, gelatin content and temperature to permit effective, rapid and substantially uniform distribution of the gelatin through the base material to provide a food product with thermal stability and capability of admixture with other ingredients, adding the gelatin solution to the cold base material while effecting rapid mechanical mixing, and wherein the gelatin solution provides:

(A) sufficient thermal load to maintain the gelatin solution and the cold base material with low enough viscosity to permit rapid and substantially uniform distribution during the mixing step;

(B) sufficient gelatin to provide the stability required in the food product; and (C) sufficient gelatin to substantially obviate breakdown or collapse of the aerated base material during or after the mixing step; and wherein the gelatin solution is selected to provide a gelatin content of the final product in the range of 1% to 3% by weight.

6. A method of making a food product which comprises:

(A) aerating a predetermined volume at a preselected temperature of a cold base material comprising (i) a dairy product selected from the group consisting of cream, thickened cream, and mixtures thereof, and (ii) a further ingredient selected from the group consisting of artificial cream, cream cheese, condensed milk, and mixtures thereof the aerating being carried out to create an overrun of the original aerated volume of the base material in the range of 10–40%;

(B) adding a predetermined volume at a preselected temperature of a hot aqueous solution of gelatin to the cold aerated base material while mixing; and (C) allowing the resulting product to set while maintaining the aerated structure;

(D) wherein said preselected temperatures and said preselected volumes are chosen such that, after mixing, the temperature of the resulting product is about 10° C.; and wherein said gelatin solution contains about 10% by weight of gelatin.

7. A product produced by the process of claim 6.

8. A method of providing stability in a dairy product to be stored in cooled or frozen conditions, comprising intimately mixing a dairy product with the product of claim 7.

* * * * *